Oct. 17, 1967  S. BALOGH  3,347,387

FILTER-DRYER

Filed June 3, 1965

INVENTOR.
STEPHEN BALOGH
BY John N. Wolfram
ATTORNEY

United States Patent Office 3,347,387
Patented Oct. 17, 1967

3,347,387
FILTER-DRYER
Stephen Balogh, Lyons, N.Y., assignor to Parker-Hannifin Corporation, Cleveland, Ohio, a corporation of Ohio
Filed June 3, 1965, Ser. No. 461,050
1 Claim. (Cl. 210—266)

ABSTRACT OF THE DISCLOSURE

A filter-dryer for refrigerant fluids wherein a cup-shaped rigid filter block of foraminous material is spring pressed toward a transverse wall of a surrounding shell, the block contains loose desiccant particles, a perforated plate retains the particles and is pressed thereagainst by a spring retained within the block by another plate that is clamped between the block and the transverse wall of the shell.

---

This invention relates to a combination filter-dryer device for removing solid impurities and water from refrigerant fluids in refrigeration or air conditioning systems and more particularly to filter-dryer devices in which a desiccant is contained within a hollow filtering element of foraminous rigid material.

It is an object of the invention to provide a device of this type in which the desiccant contained within a hollow filter block is compacted so as to prevent rubbing and powdering of the particles, such compacting being accomplished by a biasing means that is also fluid contained within the rigid filter block.

It is another object to provide a filter-dryer having a cup-shaped rigid filter block containing loose desiccant material and that has a member engaging the open end of the block for containing the particles, such member being shaped to trap any particles breaking off of the block by contact with such member.

It is another object to provide a filter-dryer having a foraminous filter element of rigid material in which the filter element is mounted within a metallic shell with intervening fiberglass cushioning pads that serve as a shock mount to prevent damage to the filter block under vibration.

Other objects of the invention will be apparent from the following description and from the drawings in which.

Figures 1, 2:
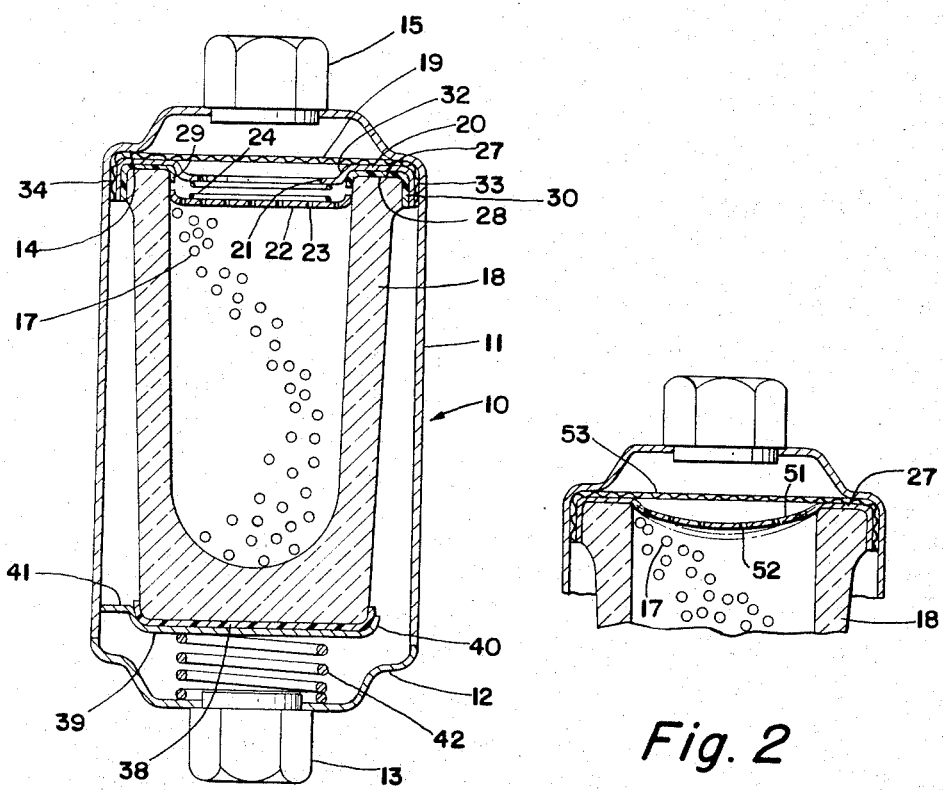
FIG. 1 is a longitudinal cross-section view of one form of the invention.
FIG. 2 is a fragmentary cross-section view of another form of the invention.

The filter-dryer 10 shown in FIG. 1 includes a cylindrical shell 11 closed at its lower end by a cap 12 that is brazed to the shell and to an inlet port fitting 13. The upper end of shell 11 is inwardly formed to provide an annular transverse wall 14 and it has an outlet fitting 15 brazed thereto.

Mounted within shell 11 is a molded filter block 18 of foraminous ceramic material and it contains loose desiccant particles 17, such as synthetic zeolite molecular seives, activated alumina, silica gel, or the like. The open end of the filter block is closed by a fine mesh screen 19. Below the screen is a thin metal plate 20 having a central opening 21. A baffle 22 having perforations 23 engages desiccant particles 17 and is pressed thereagainst by a spring 24 that bears against plate 20. By this means looseness of the desiccant particles 17 is eliminated so that they do not rub aganist each other to produce powdering of the same.

Between plate 20 and the upper rim 27 of filter block 18 is an annular fiberglass pad 28 that is downturned at its inner margin to form a short cylindrical skirt 29 and that is likewise downturned at its outer margin to form a cylindrical skirt 30. Plate 20 is likewise formed with a short generally cylindrical section 32 and an outer cylindrical skirt 33 that is surrounded by an outer cylindrical skirt 34 on screen 19.

At the lower end of the filter block is a fiberglass pad 38 held in position by a metal plate 39 that has an upturned annular rim 40 and a plurality of radially extending fingers 41 that engage the side wall of shell 11 for centering and radially supporting filter block 18. A spring 42 bears against cap 12 and plate 39 for pressing the filter block upwardly with screen 19 in tight engagement with transverse shoulder 14 of shell 11. Fiberglass pads 30 and 38 provide cushioning support for the ceramic block 18 and isolate the same from contact with metallic portions of the filter-dryer to provide a shock mount to resist damage under vibration. Also, fiberglass pad 30 is curled over the inner and outer edges of the upper end of block 18 and will trap and retain any particles of the ceramic block breaking loose therefrom along upper rim 27, while fiberglass pad 38 will trap and retain any particles breaking loose from the lower end of the ceramic block.

In the form of the invention shown in FIG. 2, the fiberglass pad at the upper end of ceramic block 18 is dispensed with and a plate 51 serves as both a baffle for retaining desiccant particles 17 and as a spring for compacting the same. Plate 51 is also downturned to engage the inner and outer cylindrical edges of rim 27 of block 18 for trapping therebetween any particles of the block breaking loose from rim 27. Plate 51 is initially inwardly bowed as indicated by the dotted lines of FIG. 2 and is sprung to the position shown in the full line by its compacting engagement with desiccant particles 17 and in this manner spring loads the latter to eliminate looseness. Plate 51 has perforations 52 therethrough and a screen 53 extending across the open end of block 18 serves as a fine mesh filter.

Although only two forms of the invention have been shown, it is obvious that there may be other variations coming within the inventive concepts defined in the following claim.

I claim:

In a filter-dryer, a shell having inlet and outlet ports and a transverse wall adjacent one of the ports, a cup-shaped filter block of rigid foraminous material within said shell with its open end facing said transverse wall, a first spring coacting between the other end of said shell and the closed end of said block and urging the block toward said transverse wall, loose desiccant particles within and substantially filling said block, a first perforated plate slidably movable within said block and closely fitting said open end and directly in contact with said particles and retaining the same within said block, a second perforated plate extending across the open end of said block and having its outer margin clamped between said transverse wall and the adjacent end of said block and having an axial flange extending between the block and shell, said first plate being dished to provide a spring chamber within the block and between the two plates, a second spring substantially centrally disposed within the chamber and compressed between the two plates whereby the first plate exerts substantially uniform pressure against said particles.

References Cited
UNITED STATES PATENTS

| | | | |
|---|---|---|---|
| 2,647,635 | 8/1953 | Hove et al. | 210—352 |
| 2,798,718 | 7/1957 | Gross | 55—316 X |
| 3,170,872 | 2/1965 | Balogh et al. | 210—266 |
| 3,175,342 | 3/1965 | Balogh | 210—266 X |

SAMIH N. ZAHARNA, *Primary Examiner.*